United States Patent
Beuterbaugh et al.

(10) Patent No.: US 11,787,999 B2
(45) Date of Patent: Oct. 17, 2023

(54) ACIDIZING COMPOSITIONS FOR IMPROVED FLUID PERFORMANCE

(71) Applicant: Halliburton Energy Services, Inc., Houston, TX (US)

(72) Inventors: Aaron Michael Beuterbaugh, Spring, TX (US); Larry Steven Eoff, Porter, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/727,340

(22) Filed: Dec. 26, 2019

(65) Prior Publication Data

US 2021/0198560 A1 Jul. 1, 2021

(51) Int. Cl.
*C09K 8/72* (2006.01)

(52) U.S. Cl.
CPC .................................. *C09K 8/725* (2013.01)

(58) Field of Classification Search
CPC . C09K 8/72; C09K 8/725; C09K 8/74; C09K 8/76; C09K 8/78; E21B 43/26; E21B 43/27; E21B 43/28
See application file for complete search history.

(56) References Cited

U.S. PATENT DOCUMENTS

| | | | |
|---|---|---|---|
| 6,476,169 B1 | 11/2002 | Eoff et al. | |
| 6,995,377 B2 * | 2/2006 | Darr | G01B 11/0625 |
| | | | 250/372 |
| 7,182,136 B2 | 2/2007 | Dalrymple et al. | |
| 8,962,535 B2 | 2/2015 | Welton et al. | |
| 9,562,423 B2 | 2/2017 | Eoff et al. | |
| 2005/0000694 A1 | 1/2005 | Dalrymple et al. | |
| 2006/0102349 A1 | 5/2006 | Brady | |
| 2008/0139412 A1 * | 6/2008 | Fuller | C09K 8/72 |
| | | | 507/219 |
| 2016/0076369 A1 * | 3/2016 | Ziauddin | C09K 8/60 |
| | | | 166/250.12 |
| 2016/0340516 A1 * | 11/2016 | Beuterbaugh | C09K 8/03 |
| 2017/0066957 A1 | 3/2017 | LaBlanc et al. | |
| 2017/0210978 A1 | 7/2017 | Beuterbaugh et al. | |

(Continued)

FOREIGN PATENT DOCUMENTS

WO    WO-2018004624 A1 *  1/2018  ............... C09K 8/76

OTHER PUBLICATIONS

International Search Report and Written Opinion dated Sep. 18, 2020 in related PCT Application No. PCT/US2019/068769 filed Dec. 27, 2019.

*Primary Examiner* — Angela M DiTrani Leff
(74) *Attorney, Agent, or Firm* — K&L Gates LLP (57) ABSTRACT

A method of stimulating a subterranean carbonate formation includes delivering a composition comprising a hydrophobically modified polymer, a phosphorylated alkyl amino polycarboxylic acid, and a base treatment acid into the subterranean formation; and contacting the subterranean carbonate formation with the composition to form conductive flowpaths in the subterranean carbonate formation. The method may further include producing hydrocarbons from the subterranean carbonate formation. A composition for stimulating a subterranean formation includes a hydrophobically modified polymer; a phosphorylated alkyl amino polycarboxylic acid; and a base treatment acid.

16 Claims, 1 Drawing Sheet

(56) References Cited

U.S. PATENT DOCUMENTS

| | | |
|---|---|---|
| 2017/0210979 A1 | 7/2017 | Cairns |
| 2019/0010385 A1 | 1/2019 | Sayed |
| 2019/0010795 A1 | 1/2019 | Lo Cascio |
| 2019/0093007 A1 | 3/2019 | Beuterbaugh et al. |

* cited by examiner

US 11,787,999 B2

ACIDIZING COMPOSITIONS FOR IMPROVED FLUID PERFORMANCE

BACKGROUND

Operations to extract a subterranean product from the earth through a well formed by a wellbore often use treatment fluids to facilitate or implement the operations. Hydrocarbons, such as oil and gas, are subterranean products commonly extracted from reservoirs, areas of the earth that contain the hydrocarbons. A reservoir may be deep below the surface of the earth and the earth may include one or more formations that are above and/or make up the reservoir. A formation is a region of the earth with a distinct lithology describing the physical characteristics of the rock in the formation, such as mineral content.

To help increase the productivity of a reservoir for hydrocarbons, stimulation techniques may be performed using treatment fluids such as stimulation fluids. For example, matrix acidizing and acid fracturing are two stimulation techniques used to increase production of hydrocarbons from a well by using acid present in respective matrix acidizing and acid fracturing fluids to dissolve rock. The dissolution of the rock creates or enlarges conductive pathways of permeability to the hydrocarbons in a subterranean formation to flow hydrocarbons from the subterranean formation to the earth's surface via the wellbore.

The choice of technique between matrix acidizing and acid fracturing tends to depend on the permeability and porosity of the subterranean formation. Unconventional hydraulic fracturing is the technique generally used for formations containing harder or very low permeability rock such as shale and tight sandstone. Acid fracturing is similar to unconventional fracturing in that it uses higher pressures and a reactive fluid for creating and enlarging fractures, microfractures, or other natural or generated flowpaths. To create and enlarge the fractures or flowpaths, acid fracturing relies on the heterogeneity of the rock leading to differential dissolution. Contrarily to hydraulic fracturing, acid fracturing typically does not include placing proppant in the created or enlarged fractures or flowpaths. Although, acid fracturing is used for some formations containing softer rock such as carbonate rock, carbonate rock tends not to lend itself to the use of proppant.

Matrix acidizing is the technique generally used for formations containing softer, permeable rock such as carbonate rock. Matrix acidizing uses an acidizing treatment fluid, introduced at lower pressures that are below fracturing gradient, for creating and enlarging conductive flowpaths. The resulting conductive flowpaths may include narrow paths termed wormholes. The high solubility of carbonate rock in the acids used for matrix acidizing facilitates wormhole formation.

One matrix acidizing composition commonly used contains hydrochloric acid, HCl, as a sole acid component. When such a HCl based stimulation fluid contacts the formation, it tends to dissolve carbonate rock close or near to the wellbore and create wide non-branching holes without effecting deep penetration into the formation. This may limit the effectiveness of common HCl based matrix acidizing stimulation treatments.

Carbonate emulsion acids tend to provide more controlled dissolution than plain HCl. Carbonate emulsion acid is a matrix or fracture acidizing composition used in the form of an emulsion to deliver acid to a carbonate formation. Stimulation methods using carbonate emulsion acid has to involve breaking the emulsion to enable effective flow-back, where flow-back is the process of allowing fluids to flow from a well after stimulation. Further, use of carbonate acid emulsion in stimulation methods lead to increased friction in tubing delivering the composition to the subterranean formation. The occurrence of friction may prevent the use of carbon emulsion acid in conjunction with coiled tubing, which is used in some wellbores, or when higher flow rates are desired.

BRIEF DESCRIPTION OF THE DRAWINGS

Embodiments of the acidizing composition for improved fluid performance are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

Figure 1:
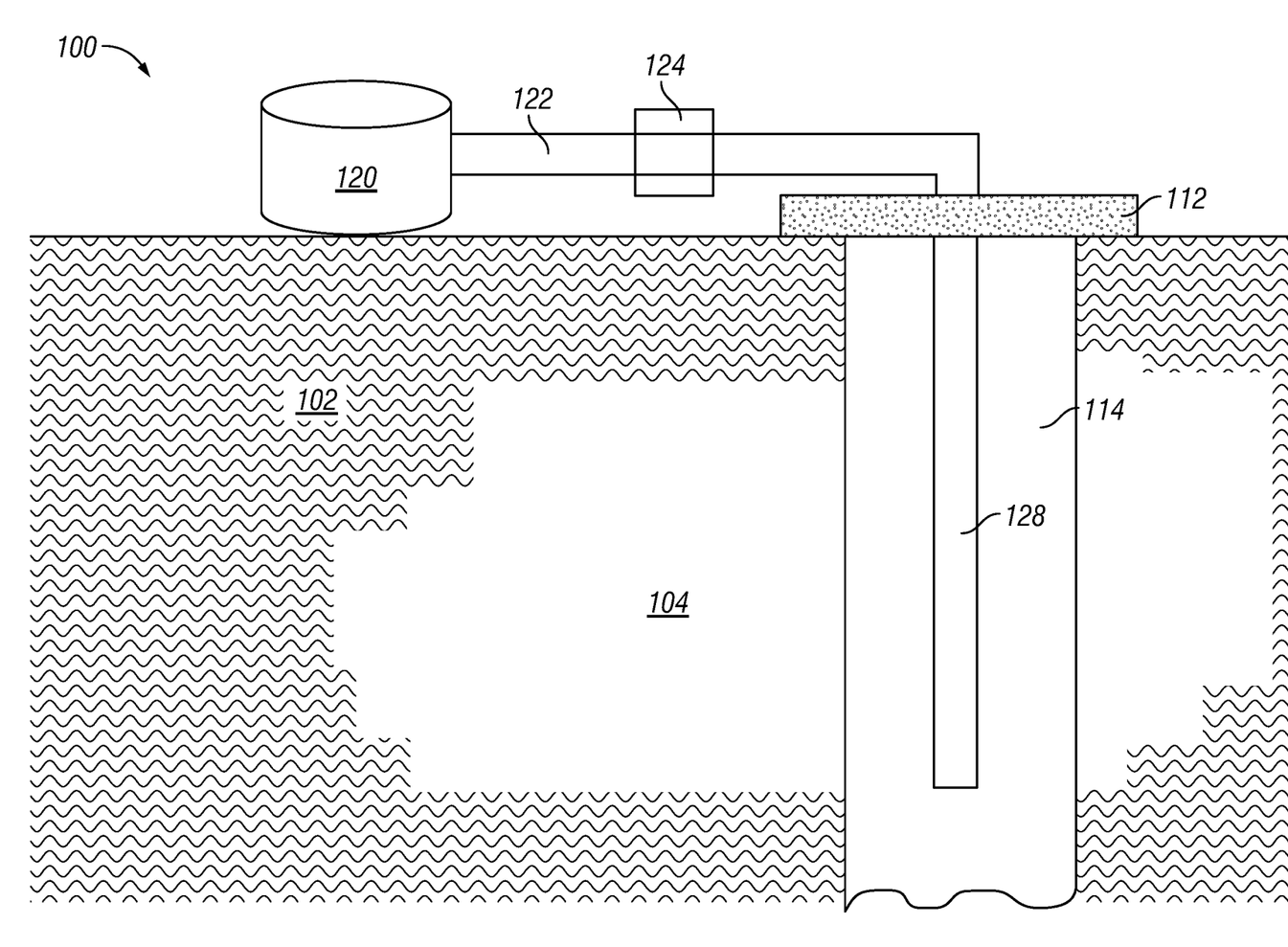
The FIGURE is a schematic view of a delivery system that can be used to introduce a stimulation fluid into a subterranean formation, according to one or more embodiments.

The present disclosure provides a matrix acidizing composition that produces wormholes with deep, and branching flowpaths. Further, the composition is not an emulsion so it does not require use of breakers and the composition has low viscosity so it can be used with coiled tubing.

Embodiments of the acidizing composition of the present disclosure include a hydrophobically modified polymer, a phosphorylated alkyl amino polycarboxylic acid, and a base treatment acid. The performance of the hydrophobically modified polymer/phosphorylated akyl amino polycarboxylic acid/HCl fluid either matches or exceeds when compared to hydrophobically modified polymer/HCl, phosphorylated amino polycarboxylic acid/HCl, or plain HCl fluids.

Embodiments of the acidizing composition of the present disclosure can improve acidizing performance, for example as determined by pore volume to breakthrough measurements, in comparison to reference compositions containing the base treatment acid and either the phosphorylated alkyl amino polycarboxylic acid without the hydrophobically modified polymer or the hydrophobically modified polymer without the phosphorylated alkyl amino polycarboxylic acid. An unexpected aspect of the improved performance is that using a lesser amount of the hydrophobically modified polymer in combination with the phosphorylated alkyl amino polycarboxylic acid results in improved performance in comparison to another composition using a reference amount of the hydrophobically modified polymer in combination with the phosphorylated alkyl amino polycarboxylic acid. The lesser and reference amounts of the hydrophobically modified polymer are in comparison to a reference composition containing the acid and the reference amount of the hydrophobically modified polymer without the phosphorylated alkyl amino polycarboxylic acid. Because the improved performance allows low concentrations for hydrophobically modified polymer and phosphorylated alkyl amino polycarboxylic acid, an advantage is lower cost.

The examples below illustrate this improved performance. Using compositions with low concentrations of hydrophobically modified polymer solution (e.g., 10 GPT hydrophobically modified polymer solution as in Example 6 of the examples), in conjunction with phosphorylated alkyl amino polycarboxylic acid in an HCl solution, improved the pore volume to breakthrough as compared to a reference composition with a higher amount of hydrophobically modified polymer solution for example 33 GPT as in comparative Example 1 of the examples, and without (that is, excluding) the phosphorylated alkyl amino polycarboxylic acid. In contrast, a composition with an amount equal to the reference amount of hydrophobically modified polymer solution in conjunction with phosphorylated alkyl amino polycarboxylic acid, for example 33 GPT hydrophobically modified polymer solution as in Example 4 of the examples, did not show improved performance in comparison to the same reference composition, in the examples comparative Example 1. The improved performance upon lowering the amount of hydrophobically modified polymer solution, for example from 33 GPT to 10 GPT was unexpected. In another example, comparing a composition with a lower amount of hydrophobically modified polymer solution, for example 10 GPT as in Example 6 of the examples and a lower amount of phosphorylated alkyl amino polycarboxylic acid, for example 2.1 wt. % phosphorylated alkyl amino polycarboxylic acid as in Example 6 of the examples, to a composition with a higher amount of hydrophobically modified polymer solution, for example 33 GPT as in Example 4 of the examples and a higher amount of phosphorylated alkyl amino polycarboxylic acid, for example 3.5 wt %, as in Example 4 of the examples, the composition with the lower amounts of both hydrophobically modified polymer solution and phosphorylated alkyl amino polycarboxylic acid unexpectedly had improved pore volume to breakthrough. Thus, while Example 4 illustrates the inventive composition, Examples 5 and 6 illustrate the unexpected improvement in performance upon lowering the concentrations of hydrophobically modified polymer solution and phosphorylated alkyl amino polycarboxylic acid.

It will be understood that other concentrations than those tested in the examples are contemplated. While not wishing to be limited by theory, the present inventors believe that the concentration of hydrophobically modified polymer solution is desirably set at an amount effective to accomplish the lowest pore volume to breakthrough on a calcite laden core. The hydrophobically modified polymer solution is desirably present in an amount to provide to the composition shear thickening non-Newtonian fluid behavior. For example, the compositions of the present disclosure may include between 0.05 and 15 wt % hydrophobically modified polymer solution. While not wishing to be limited by theory, the present inventors believe that the concentration of phosphorylated alkyl ammo polycarboxylic acid is desirably set at an amount effective to adhere or bind to a calcite surface at low pH (less than a neutral pH of 7). This gives a molecular film on the calcite surface thus inhibiting further reaction by the base treatment acid. For example, certain embodiments may include between 0.25 and 20 wt. % phosphorylated alkyl amino polycarboxylic acid. While not wishing to be limited by theory, the present inventors believe that the concentration of base treatment acid is desirably set at an amount effective for forming wormholes during a matrix acidizing treatment. For example, certain embodiments may include between 1.0 and 30 wt. % base treatment acid.

Hydrophobically Modified Polymer

The hydrophobically modified polymer may be a copolymer containing hydrophilic monomers and hydrophobically-modified hydrophilic monomers. Suitable hydrophobically modified polymers include an acrylamide/ octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer.

The hydrophobically modified polymer is prepared from the polymerization reaction of hydrophilic monomers and hydrophobically-modified hydrophilic monomers.

Examples of particularly suitable hydrophilic monomers that can be utilized include acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide and hydroxyethyl acrylate. Of these, acrylamide, 2-acrylamido-2-methyl propane sulfonic acid, acrylic acid, dimethylaminoethyl methacrylate, dimethylaminopropyl methacrylamide and vinyl pyrrolidone are preferred. One example of a suitable commercially available hydrophobically modified polymer that may be used in accordance with the present disclosure is sold under the trade name "HPT-1" by Halliburton Energy Services, Houston, Tex.

Examples of particularly suitable hydrophobically-modified hydrophilic monomers that can be utilized include, but are not limited to, alkyl acrylates, alkyl methacrylates, alkyl acrylamides and alkyl methacrylamides wherein the alkyl radicals have from about 4 to about 22 carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms and alkyl dimethylammoniumpropyl methacrylamide bromide, alkyl dimethylammonium propylmethacrylamide chloride and alkyl dimethylammoniumpropyl methacrylamide iodide wherein the alkyl groups have from about 4 to about 22 carbon atoms.

Hydrophobically modified polymers can be prepared by polymerizing any one or more of the hydrophilic monomers with any one or more of the hydrophobically modified hydrophilic monomers. Methods for preparing such polymers are known to those skilled in the art.

Suitable polymers prepared as described above have estimated molecular weights in the range of from about 250,000 to about 3,000,000 and have mole ratios of the hydrophilic monomer(s) to the hydrophobically modified hydrophilic monomer(s) in the range of from about 99.98: 0.02 to about 90:10.

Phosphorylated Alkyl Amino Polycarboxylic Acid

The phosphorylated alkyl amino polycarboxylic acid may include at least one aminopolycarboxylic acid functional group and at least one phosphonic acid functional group. Suitable phosphorylated alkyl amino polycarboxylic acids include N-phosphonomethyl iminodiacetic acid (PMIDA), aminotris(methylenephosphonic acid) (ATMP), N,N-bis (phosphonomethyl)glycine (BPMG), derivatives of N-phosphonomethyl iminodiacetic acid, derivatives of aminotris(methylenephosphonic acid), and derivatives of N,N-bis(phosphonomethyl)glycine (BPMG).

The phosphorylated alkyl amino polycarboxylic acid may be supplied in the form of a salt of the phosphorylated alkyl amino polycarboxylic acid. Suitable salts include salts formed with metal cations. The salt may be formed by combining MOH with the phosphorylated alkyl amino polycarboxylic acid, wherein M is a metal. The salt form is reprotonated to generate phosphorylated alkyl amino polycarboxylic acid when it is combined with the base treatment acid. For example, N-phosphonomethyl iminodiacetic acid may be supplied in the form of N-phosphonomethyl iminodiacetic acid tri-potassium salt. Approximately 3 equivalents of KOH may be combined with one equivalent of N-phosphonomethyl iminodiacetic acid to generate the N-phosphonomethyl iminodiacetic acid tri-potassium salt.

Base Treatment Acid

The base treatment acid may be any acid suitable for carbonate acidizing. In certain embodiments, the base treatment acid may be a hydrohalic acid or an organic acid. For example, the base treatment acid may be hydrochloric acid. An advantage of the present composition is that because it does not contain an inorganic salt it can contain greater than 15 wt. % HCl, for example 28 wt. % HCl. Other suitable base treatment acids include hydrofluoric acid, phosphoric acid, sulfuric acid, sulfonic acid, nitric acid, acetic acid, acetic anhydride, citric acid, glycolic acid, and formic acid. The base treatment acid may be a chelating acid. Suitable chelating acids include methylglycinediacetic acid (MGDA) and glutamic diacetic acid (GLDA).

Carrier Fluid

The compositions of the present disclosure further include a carrier fluid. In one or more embodiments, the carrier fluid is aqueous. The carrier fluid provides a medium that carries the hydrophobically modified polymer, phosphorylated alkyl amino polycarboxylic acid, and base treatment acid into the wellbore. The carrier fluid further acts as a solvent for dissolved components and a suspension medium for solid components. Typically the base treatment acid, phosphorylated alkyl amino polycarboxylic acid, and hydrophobically modified polymer are dissolved. In one or more embodiments, an aqueous carrier fluid is a brine. In one or more embodiments, the brine includes a salt. For example, the carrier fluid may be an aqueous solution containing KCl, for example an aqueous solution of 2% KCl. Other suitable salts include NaCl, NaBr, $NH_4Cl$, and LiCl. The amounts of each of the hydrophobically modified polymer, phosphorylated alkyl amino polycarboxylic acid, and base treatment acid in the composition may be expressed as respective concentrations of the hydrophobically modified polymer, phosphorylated alkyl amino polycarboxylic acid, and base treatment acid in the carrier fluid. When the carrier fluid is a brine, the amounts of each of the hydrophobically modified polymer, phosphorylated alkyl amino polycarboxylic acid, and base treatment acid in the composition may be expressed as respective concentrations of the hydrophobically modified polymer, phosphorylated alkyl amino polycarboxylic acid, and base treatment acid in the water of the brine.

Other Components

The compositions of the present disclosure may further include other components known as components of acidizing stimulation fluids. The other components may be components known as components of matrix acidizing fluids. The other components may be components of stimulation fluids that are matrix acidizing fluids for carbonate formations.

Delivery System

There are no equipment modifications needed as compared to a conventional acidizing stimulation. The compositions of the present disclosure are designed to be used as an acidizing additive thus requiring no specialized pumping or additional equipment.

The FIGURE is a schematic view of a delivery system 100 that can be used to deliver or otherwise introduce one or more stimulation fluids into a downhole location, such as a subterranean formation 104, according to one or more embodiments. It should be noted that while the FIGURE generally depicts a land-based system, it is to be recognized that like systems can be operated in subsea locations as well. As depicted in the FIGURE, the delivery system 100 can include a container 120, in which one or more stimulation fluids can be made, stirred, mixed, stored, or any combination thereof. For example, one or more of the polymers, one or more of the particulate additives, and one or more of the organic solvents can be in introduced or otherwise added into the container and can be mixed or otherwise combined to produce the stimulation fluid. Thereafter, the stimulation fluid can be stored until ready to be used. The container 120 can be, but is not limited to, one or more tanks, vessels, columns, or reactors and can include one or more mixing devices and one or more heat control devices.

The stimulation fluid can be conveyed or otherwise transported from the container 120 via line 122 to one or more wellheads 112, where the stimulation fluid can be introduced into one or more lines 128. The line 128 can extend from the wellhead 112 into one or more wellbores 114 and the subterranean formation 104 each formed in the terrain 102. One or more pumps 124 can be coupled to and in fluid communication with the line 122, as shown in the FIGURE, and/or with the line 128, not shown. The pump 124 can be used to transport the stimulation fluid from the container 120, through the lines 122, 124 and the wellbore 114, and into the subterranean formation 104. The pump 124 can also be used to control the pressure within the wellbore 114 and the subterranean formation 104.

One or more aqueous downhole fluids can be disposed or otherwise contained within at least the subterranean formation 104. Upon being ejected or otherwise exiting from the line 128, the stimulation fluid can subsequently penetrate into the subterranean formation 104 and combine or otherwise mix with the aqueous downhole fluid to produce the polymeric additive composite and a fluid mixture within the subterranean formation 104. The fluid mixture can contain the combination of the aqueous downhole fluid and the one or more organic solvents derived from the stimulation fluid.

It is to be recognized that the delivery system 100 is merely exemplary in nature and various additional components can be present that have not necessarily been depicted in the FIGURE in the interest of clarity. Non-limiting additional components that can be present include, but are not limited to, supply hoppers, mixing devices, valves, condensers, adapters, joints, gauges, sensors, pumps, compressors, pressure controllers, pressure sensors, flow rate controllers, flow rate sensors, temperature sensors, or temperature control devices.

Method

Both the phosphorylated alkyl amino polycarboxylic acid and hydrophobically modified polymer can be provided as liquid concentrates which can be mixed on-the-fly during delivery or can be batch mixed. In one or more embodiments, the phosphorylated alkyl amino polycarboxylic acid and hydrophobically modified polymer are batch mixed and then pumped. In one or more embodiments, the phosphorylated alkyl amino polycarboxylic acid and hydrophobically modified polymer are batch mixed and stored and pumped at a later time.

Methods for stimulating a subterranean carbonate formation include delivering a composition comprising a hydrophobically modified polymer, a phosphorylated alkyl amino polycarboxylic acid, and a base treatment acid into a subterranean formation. The methods may further include mixing the phosphorylated alkyl amino polycarboxylic acid and the hydrophobically modified polymer to form a mixture. The methods may further include adding the mixture to a fluid containing the base treatment acid and/or the carrier fluid, and/or other components. The methods may include on-the-fly mixing, that is simultaneously, mixing and adding. Alternatively, the method may include batch mixing the phosphorylated alkyl amino polycarboxylic acid and the hydrophobically modified polymer to form a mixture before adding the mixture to a fluid containing the base treatment acid and/or the carrier fluid, and/or other components.

Methods for stimulating a subterranean carbonate formation further include contacting the subterranean carbonate formation with the composition to form conductive flowpaths in the subterranean carbonate formation. The flowpaths may form as wormholes in the subterranean carbonate formation. The methods may further include mixing the phosphorylated alkyl amino polycarboxylic acid and the hydrophobically modified polymer to form a mixture and adding the mixture to a fluid containing the base treatment acid and/or the carrier fluid, and/or other components before contacting the composition with the subterranean carbonate formation or while contacting the composition with the subterranean carbonate formation.

One or more specific embodiments of the acidizing composition for improved fluid performance have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

Certain terms are used throughout the description and claims to refer to particular features or components. As one skilled in the art will appreciate, different persons may refer to the same feature or component by different names. This document does not intend to distinguish between components or features that differ in name but not function.

Unless otherwise indicated, a numerical parameter "n" expressing quantities used in the present disclosure and associated claims means "about n." Accordingly, unless otherwise indicated, reference to a numerical parameter in the specification and attached claims is an approximation that may vary depending upon the property the numerical parameter represents and the measurement method used to determine the property. For example, the approximation may be at least that of significant digits, with each numerical parameter given to not more than significant digits. For example, the appropriate number of significant digits associated with a measurement method is a baseline for the degree of approximation. For numerical parameters reported in alternative units ordinary rounding techniques are applied. For example, ° C. and ° F. are alternative units and kilogram (kg) and pound (lb) are alternative units.

Whenever a numerical range with a lower and upper limit is disclosed, any number and any included range falling within the range is specifically disclosed. In particular, every range of values is to be understood to set forth every number and range encompassed within the broader range of values. Reference to "from n to m" indicates a closed range [n,m]. Reference to "from n to less than m" indicates a half open range [n,m). Reference to "greater than n and up to m" indicates another half open range (n,m]. Reference to "greater than a and less than b" indicates an open range (n,m).

Reference throughout this specification to "include" means include, but is not limited to. Likewise, reference through this specification to "includes" means includes, but is not limited to.

Reference throughout this specification to "one embodiment," "an embodiment," "an embodiment," "embodiments," "some embodiments," "certain embodiments," or similar language means that a particular feature, structure, or characteristic described in connection with the embodiment may be included in at least one embodiment of the present disclosure. Thus, these phrases or similar language throughout this specification may, but do not necessarily, all refer to the same embodiment.

SPECIFIC EMBODIMENTS

Methods of stimulating a subterranean carbonate formation may include delivering a composition comprising a hydrophobically modified polymer, a phosphorylated alkyl amino polycarboxylic acid, and a base treatment acid into the subterranean carbonate formation; and contacting the subterranean carbonate formation with the composition to form conductive flowpaths in the subterranean carbonate formation.

The methods may include the embodiments of any preceding paragraph or combination thereof and further include wherein the composition comprises between 0.05 and 15 wt % hydrophobically modified polymer solution.

The methods may include the embodiments of any preceding paragraph or combination thereof and further include wherein the composition comprises between 0.25 and 20 wt. % phosphorylated alkyl amino polycarboxylic acid.

The methods may include the embodiments of any preceding paragraph or combination thereof and further include wherein the composition comprises between 1.0 and 30 wt. % base treatment acid.

The methods may include the embodiments of any preceding paragraph or combination thereof and further include wherein the phosphorylated alkyl amino polycarboxylic acid is selected from the group consisting of N-phosphonomethyliminodiacetic acid (PMIDA), phosphorylated alkyl amino polycarboxylic acid is aminotris(methylenephosphonic acid) (ATMP), phosphorylated alkyl amino polycarboxylic acid is N,N-bis(phosphonomethyl)glycine (BPMG), and derivatives thereof.

The methods may include the embodiments of any preceding paragraph or combination thereof and further include wherein the hydrophobically modified polymer is selected from the group consisting of acrylamide/octadecyldimethylammoniumethyl methacrylate bromide copolymers, dimethylaminoethyl methacrylate/hexadecyldimethylammoniumethyl methacrylate bromide copolymers, dimethylaminoethyl methacrylate/vinyl pyrrolidone/hexadecyldimethylammoniumethyl methacrylate bromide terpolymers and acrylamide/2-acrylamido-2-methyl propane sulfonic acid/2-ethylhexyl methacrylate terpolymers.

The methods may include the embodiments of any preceding paragraph or combination thereof and further include wherein the base treatment acid is selected from the group consisting of hydrochloric acid, hydrofluoric acid, phosphoric acid, sulfuric acid, sulfonic acid, nitric acid, acetic acid, acetic anhydride, citric acid, glycolic acid, and formic acid, methylglycinediacetic acid (MGDA), and glutamic diacetic acid (GLDA).

For example, methods of stimulating a subterranean carbonate formation may include delivering a composition comprising a hydrophobically modified polymer, a phosphorylated alkyl amino polycarboxylic acid, and a base treatment acid into the subterranean carbonate formation; and contacting the subterranean carbonate formation with the composition to form conductive flowpaths in the subterranean carbonate formation, wherein the composition comprises between 0.05 and 15 wt % hydrophobically modified polymer solution, wherein the composition comprises between 0.25 and 20 wt. % phosphorylated alkyl amino polycarboxylic acid, wherein the composition comprises between 1.0 and 30 wt. % base treatment acid, wherein the phosphorylated alkyl amino polycarboxylic acid is phosphonomethyliminodiacetic acid, wherein the hydrophobically modified polymer is selected from the group consisting of acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer, and wherein the base treatment acid comprises hydrochloric acid.

Compositions for stimulating a subterranean formation may include a hydrophobically modified polymer; a phosphorylated alkyl amino polycarboxylic acid; and a base treatment acid.

The compositions may include the embodiments of any preceding paragraph or combination thereof and further include wherein the composition comprises between 0.05 and 15 wt % hydrophobically modified polymer solution.

The compositions may include the embodiments of any preceding paragraph or combination thereof and further include wherein the composition comprises between 0.25 and 20 wt. % phosphorylated alkyl amino polycarboxylic acid.

The compositions may include the embodiments of any preceding paragraph or combination thereof and further include, wherein the composition comprises between 1.0 and 30 wt. % base treatment acid.

The compositions may include the embodiments of any preceding paragraph or combination thereof and further include wherein the phosphorylated alkyl amino polycarboxylic acid is selected from the group consisting of N-phosphonomethyliminodiacetic acid (PMIDA), phosphorylated alkyl amino polycarboxylic acid is aminotris(methylenephosphonic acid) (ATMP), phosphorylated alkyl amino polycarboxylic acid is N,N-bis(phosphonomethyl) glycine (BPMG), and derivatives thereof.

The compositions may include the embodiments of any preceding paragraph or combination thereof and further include wherein the hydrophobically modified polymer is selected from the group consisting of acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer.

The compositions may include the embodiments of any preceding paragraph or combination thereof and further include wherein the base treatment acid is selected from the group consisting of hydrochloric acid, hydrofluoric acid, phosphoric acid, sulfuric acid, sulfonic acid, nitric acid, acetic acid, acetic anhydride, citric acid, glycolic acid, and formic acid, methylglycinediacetic acid (MGDA), and glutamic diacetic acid (GLDA).

For example, compositions for stimulating a subterranean formation may include a hydrophobically modified polymer; a phosphorylated alkyl amino polycarboxylic acid; and a base treatment acid, wherein the composition comprises between 0.05 and 15 wt % hydrophobically modified polymer solution, wherein the composition comprises between 0.25 and 20 wt. % phosphorylated alkyl amino polycarboxylic acid, between 1.0 and 30 wt. % base treatment acid, wherein the phosphorylated alkyl amino polycarboxylic acid is phosphonomethyliminodiacetic acid, wherein the hydrophobically modified polymer is selected from the group consisting of acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer, and wherein the base treatment acid comprises hydrochloric acid.

Methods of extracting hydrocarbons may include delivering a composition comprising a hydrophobically modified polymer, a phosphorylated alkyl amino polycarboxylic acid, and a base treatment acid into the subterranean formation via a wellbore; contacting the subterranean carbonate formation with the composition to form conductive flowpaths in the subterranean carbonate formation; and producing hydrocarbons from the subterranean formation through the wellbore.

The methods may include the embodiments of any preceding paragraph or combination thereof and further include wherein the composition comprises between 0.05 and 15 wt % hydrophobically modified polymer solution.

The methods may include the embodiments of any preceding paragraph or combination thereof and further include wherein the composition comprises between 0.25 and 20 wt. % phosphorylated alkyl amino polycarboxylic acid.

The methods may include the embodiments of any preceding paragraph or combination thereof and further include wherein the composition comprises between 1.0 and 30 wt. % base treatment acid.

The methods may include the embodiments of any preceding paragraph or combination thereof and further include wherein the phosphorylated alkyl amino polycarboxylic acid is selected from the group consisting of N-phosphonomethyliminodiacetic acid (PMIDA), phosphorylated alkyl amino polycarboxylic acid is aminotris(methylenephosphonic acid) (ATMP), phosphorylated alkyl amino polycarboxylic acid is N,N-bis(phosphonomethyl)glycine (BPMG), and derivatives thereof.

The methods may include the embodiments of any preceding paragraph or combination thereof and further include wherein the hydrophobically modified polymer is selected from the group consisting of acrylamide/octadecyldimethylammoniumethyl methacrylate bromide copolymers, dimethylaminoethyl methacrylate/hexadecyldimethylammoniumethyl methacrylate bromide copolymers, dimethylaminoethyl methacrylate/vinyl pyrrolidone/hexadecyldimethylammoniumethyl methacrylate bromide terpolymers and acrylamide/2-acrylamido-2-methyl propane sulfonic acid/2-ethylhexyl methacrylate terpolymers.

The methods may include the embodiments of any preceding paragraph or combination thereof and further include wherein the base treatment acid is selected from the group consisting of hydrochloric acid, hydrofluoric acid, phosphoric acid, sulfuric acid, sulfonic acid, nitric acid, acetic acid, acetic anhydride, citric acid, glycolic acid, and formic acid, methylglycinediacetic acid (MGDA), and glutamic diacetic acid (GLDA).

For example, extracting hydrocarbons may include delivering a composition comprising a hydrophobically modified polymer, a phosphorylated alkyl amino polycarboxylic acid, and a base treatment acid into the subterranean formation via a wellbore; contacting the subterranean carbonate formation with the composition to form conductive flowpaths in the subterranean carbonate formation; and producing hydrocarbons from the subterranean formation through the wellbore, wherein the composition comprises between 0.05 and 15 wt % hydrophobically modified polymer solution, wherein the composition comprises between 0.25 and 20 wt. % phosphorylated alkyl amino polycarboxylic acid, wherein the composition comprises between 1.0 and 30 wt. % base treatment acid, wherein the phosphorylated alkyl amino polycarboxylic acid is phosphonomethyliminodiacetic acid, wherein the hydrophobically modified polymer is selected from the group consisting of acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer, and wherein the base treatment acid comprises hydrochloric acid.

To facilitate a better understanding of the disclosure, the following non-limiting examples are given. The following examples are not the only examples that could be given and are not intended to limit the scope of the disclosure, including the claims.

EXAMPLES

The examples illustrates the improved performance of compositions of the present disclosure. In particular, the improved performance is demonstrated through improved pore volume to breakthrough results shown in core flood testing.

In the examples, for each concentration specified as a %, the % is weight %, also termed wt. %, also termed % w/w. For each concentration specified in GPT, GPT represents gallons per thousand gallons.

The core flood testing of the following examples used a conventional core testing process. Core samples obtained from a quarried outcrop formation were used. The carbonate rock in the core samples contained porosity from which the cumulative porosity volume gives the pore volume (PV) of the representative core. Connections between pores gave permeability. With some permeability flow through the core was possible. Fluid was pumped into a core sample. Amounts of fluid passed through the core sample were measure in units of pore volume. During injection pumping of the fluid into the core there was a differential pressure measured across the core. Once the reactive fluid made a hole through the core, the differential pressure drops thus indicating breakthrough. The volume of treatment fluid pumped compared to the pore volume of the core gives pore volume to breakthrough ($PV_{bt}$).

For comparative Examples 1-3 and Examples 4-6 core samples from the same sourced carbonate rock were used and the carrier fluid, pre-flush, and post-flush fluid was a brine containing 2% KCl. For each example, the concentration of HCl was 15%, the flow rate was 1 mL/minute and the temperature was 200° F. For each example, the permeability was measured in units of millidarcy (mD) as calculated by laminar flow through a porous media as dictated by Darcy's Law.

Table 1 shows the results of pore volume to breakthrough testing, that is the results for PVbt, where PVbt is in units of pore volume, as described in the above paragraph. In Table 1, the phosphorylated alkyl amino polycarboxylic acid is denoted component A. Component A included N-phosphonomethyl iminodiacetic acid in the form of the tri-potassium salt. That is, Component A was N-phosphonomethyl iminodiacetic acid tri-potassium salt. N-phosphonomethyl iminodiacetic acid tri-potassium salt was reprotonated when it was placed in the acid base treatment acid. Approximately 3 equivalents of KOH was combined with one equivalent of N-phosphonomethyl iminodiacetic acid to generate the N-phosphonomethyl iminodiacetic acid tri-potassium salt. In Table 1, the hydrophobically modified polymer solution is denoted component B. Component B was a commercial form of hydrophobically modified polymer solution available under the trade name HPT-1 from Halliburton Energy Services, Inc.

TABLE 1

Core flood test results

| Example | Component A (wt %) | Component B (GPT) | Estimated Cost (nominal unit) | Initial permeability (mD) | PVbt |
|---|---|---|---|---|---|
| 1 | 0.0 | 33.0 | 0.12 | 0.68 | 3.87 |
| 2 | 7.0 | 0.0 | 1.0 | 0.57 | 1.54 |
| 3 | 2.1 | 0.0 | 0.3 | 0.70 | 4.69 |
| 4 | 3.5 | 33.0 | 0.62 | 0.77 | 4.17 |
| 5 | 2.1 | 16.5 | 0.36 | 0.64 | 1.54 |
| 6 | 2.1 | 10.0 | 0.33 | 0.71 | 1.50 |

As a base reference, in evaluating the results of Table 1, a PVbt value known for 15% HCl in water is 11 and the initial permeability for this test is similar to the results shown in Table 1. This PVbt value for 15% HCl is illustrative of the performance of plain HCl fluids for forming flowpaths. All of the results in Table 1 show better performance than the base reference. That is, all the results in Table 1 show lower PVbt than 11.

Example 1 is a comparative example which shows that Component B used at a concentration of 33 GPT in 15% HCl gave better results than plain 15% HCl, but not the efficiency noted in Example 2 using 7% Component A in 15% HCl.

Example 2 is a comparative example which shows that Component A in 15% HCl gave great performance (low PVbt) when used at suitable concentration. Example 2 shows 7% Component A in 15% HCl gives better efficiency than 33 GPT Component B in 15% HCl.

Example 3 is a comparative example which shows that a reduced amount of Component A in 15% HCl at an amount to give roughly one third the amount as for Example 2, reduced the performance (elevated the PVbt) to worse than the performance for Example 1.

Example 4 as compared to Example 1 shows that surprisingly adding 3.5% Component A to 33 GPT in 15% HCl gave slightly worse performance.

Example 5 as compared to Example 3 shows improved performance from addition of Component B to Component A. Example 5 as compared to Example 4 shows that surprisingly lowering the concentrations of both Component A and Component B, in particular to 2.1% Component A with 16.5 GPT Component B, in 15% HCl significantly improved the performance. The performance was the same as the performance of Example 2.

Example 6 shows that combining 2.1% Component A with 10 GPT Component B in 15% HCl also gives improved performance. It is noted that Examples 2 (PVbt=1.54) and 6 (PVbt=1.50) show essentially the same result for PVbt within experimental error. Example 6 as compared to Example 4 shows that surprisingly lowering the concentrations of both Component A and Component B, in particular to 2.1% Component A with 10 GPT Component B, in 15% HCl significantly improved the performance. The performance was the same as the performance of Example 2.

The compositions of Examples 5 and 6 are illustrative of compositions that provided improved performance. In particular, the results shown in Examples 5 and 6, as compared to comparative Examples 1 and 3 show compositions with both hydrophobically modified polymer and phosphorylated alkyl amino polycarboxylic acid, e.g. either Example 5 or Example 6, are capable to perform better than a composition with hydrophobically modified polymer and no phosphorylated alkyl amino polycarboxylic acid, e.g. Example 1, or phosphorylated alkyl amino polycarboxylic acid and no hydrophobically modified polymer, e.g. Example 3. A comparison of the results of Examples 5 and 6 with those of Example 2 shows that both compositions with hydrophobically modified polymer and phosphorylated alkyl amino polycarboxylic acid perform comparably to an optimized composition with phosphorylated alkyl amino polycarboxylic acid and no hydrophobically modified polymer, Example 2.

The compositions of Example 5 and 6 are illustrative of compositions with low concentrations that unexpectedly provide improved performance. In particular, the results shown illustrate a composition (e.g. Example 5 or Example 6) where a lesser non-zero amount of the hydrophobically modified polymer in combination with a lesser non-zero amount of the phosphorylated alkyl amino polycarboxylic acid is more effective for forming flowpaths in the subterranean formation in comparison to a composition (e.g. Example 4) comprising a reference non-zero amount of the hydrophobically modified polymer and a reference non-zero amount of the phosphorylated alkyl amino polycarboxylic acid.

The cores from Examples 1-6 were visually inspected after the testing. Each core was cylindrical in shape, the cylinder extending between two ends, an injection end and a production end. There was a hole extending from the injection face of each core. For Examples 1-4 the hole was larger than for Example 5 and 6. In addition, Examples 1-4 showed some facial dissolution. Facial dissolution is a region of dissolution at the surface of the core face that has an appearance like a crater. In each case the facial dissolution was contiguous with the hole through the core. The lack of facial dissolution for the holes of Examples 5 and 6 illustrates holes that are narrow paths, that is wormholes.

The embodiments disclosed, including the examples, should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method of stimulating a subterranean carbonate formation, comprising:
    delivering a composition comprising between 0.05 and 15 wt. % of a hydrophobically modified polymer solution, between 0.25 and 20 wt. % of a phosphorylated alkyl amino polycarboxylic acid, and between 1.0 and 30 wt. % of a base treatment acid into the subterranean carbonate formation; and
    interacting the composition with carbonate in the subterranean carbonate formation to form conductive flowpaths in the subterranean carbonate formation with a lower pore volume to breakthrough to improve stimulation performance compared to a composition with: (1) the same weight percent of the base treatment acid and no hydrophobically modified polymer and no phosphorylated alkyl amino polycarboxylic acid; (2) the same weight percent of the base treatment acid, the phosphorylated alkyl amino polycarboxylic acid, and no hydrophobically modified polymer; and (3) the same weight percent of the base treatment acid, a higher weight percent of the hydrophobically modified polymer, and no phosphorylated alkyl amino polycarboxylic acid.

2. The method of claim 1, wherein the phosphorylated alkyl amino polycarboxylic acid is selected from the group consisting of N-phosphonomethyliminodiacetic acid (PMIDA), aminotris(methylenephosphonic acid) (ATMP), N,N-bis(phosphonomethyl)glycine (BPMG), and derivatives thereof.

3. The method of claim 2, wherein the hydrophobically modified polymer is selected from the group consisting of acrylamide/octadecyldimethylammoniumethyl methacrylate bromide copolymers, dimethylaminoethyl methacrylate/hexadecyldimethylammoniumethyl methacrylate bromide copolymers, dimethylaminoethyl methacrylate/vinyl pyrrolidone/hexadecyldimethylammoniumethyl methacrylate bromide terpolymers and acrylamide/2-acrylamido-2-methyl propane sulfonic acid/2-ethylhexyl methacrylate terpolymers.

4. The method of claim 1, wherein the hydrophobically modified polymer is selected from the group consisting of acrylamide/octadecyldimethylammoniumethyl methacrylate bromide copolymers, dimethylaminoethyl methacrylate/hexadecyldimethylammoniumethyl methacrylate bromide copolymers, dimethylaminoethyl methacrylate/vinyl pyrrolidone/hexadecyldimethylammoniumethyl methacrylate bromide terpolymers and acrylamide/2-acrylamido-2-methyl propane sulfonic acid/2-ethylhexyl methacrylate terpolymers.

5. The method of claim 1, wherein the base treatment acid is selected from the group consisting of hydrochloric acid, hydrofluoric acid, phosphoric acid, sulfuric acid, sulfonic acid, nitric acid, acetic acid, acetic anhydride, citric acid, glycolic acid, and formic acid, methylglycinediacetic acid (MGDA), and glutamic diacetic acid (GLDA).

6. The method of claim 1, wherein the phosphorylated alkyl amino polycarboxylic acid is phosphonomethyliminodiacetic acid, wherein the hydrophobically modified polymer is selected from the group consisting of acrylamide/octadecyldimethylammoniumethyl methacrylate bromide copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer, and wherein the base treatment acid comprises hydrochloric acid.

7. The method of claim 1, wherein the composition comprises about 10 GPT of the hydrophobically modified polymer solution and about 2.1 wt. % of the phosphorylated alkyl amino polycarboxylic acid and forms the conductive flowpaths for the improved stimulation performance as compared to an otherwise identical composition comprising about 33 GPT of the hydrophobically modified polymer solution and about 3.5 wt. % of the phosphorylated alkyl amino polycarboxylic acid.

8. The method of claim 1, wherein the composition comprises an effective amount of the hydrophobically modified polymer to provide shear thickening non-Newtonian fluid behavior.

9. The method of claim 1, wherein the conductive flowpaths are formed such that a pore volume to breakthrough of a sample of the formation is less than 5.

10. The method of claim 1, wherein the conductive flowpaths are formed such that a pore volume to breakthrough of a sample of the formation is about 1.5.

11. The method of claim 1, further comprising adhering the phosphorylated alkyl amino polycarboxylic acid to a surface of the subterranean carbonate formation at a pH less than 7 to at least partially inhibit reaction between the surface and the base treatment acid.

12. The method of claim 11, wherein the composition comprises an effective amount of the phosphorylated alkyl amino polycarboxylic acid to at least partially inhibit reaction between the surface and the base treatment acid.

13. The method of claim 1, wherein the composition comprises 28 wt. % base treatment acid and the base treatment acid comprises hydrochloric acid.

14. A method of extracting hydrocarbons, comprising:
delivering a composition comprising between 0.05 and 15 wt. % of a hydrophobically modified polymer solution, between 0.25 and 20 wt. % of a phosphorylated alkyl amino polycarboxylic acid, and between 1.0 and 30 wt. % of a base treatment acid into a subterranean carbonate formation via a wellbore;
interacting the composition with carbonate in the subterranean carbonate formation to form conductive flowpaths in the subterranean carbonate formation with a lower pore volume to breakthrough to improve stimulation performance compared to a composition with: (1) the same weight percent of the base treatment acid and no hydrophobically modified polymer and no phosphorylated alkyl amino polycarboxylic acid; (2) the same weight percent of the base treatment acid, the phosphorylated alkyl amino polycarboxylic acid, and no hydrophobically modified polymer; and (3) the same weight percent of the base treatment acid, a higher weight percent of the hydrophobically modified polymer, and no phosphorylated alkyl amino polycarboxylic acid; and
producing hydrocarbons from the subterranean carbonate formation through the wellbore.

15. The method of claim 14, wherein the phosphorylated alkyl amino polycarboxylic acid is selected from the group consisting of N-phosphonomethyliminodiacetic acid (PMIDA), aminotris(methylenephosphonic acid) (ATMP), N,N-bis(phosphonomethyl)glycine (BPMG), and derivatives thereof; and the hydrophobically modified polymer is selected from the group consisting of acrylamide/octadecyldimethylammoniumethyl methacrylate copolymer, a dimethylaminoethyl methacrylate/hexadecyldimethylammoniumethyl methacrylate bromide copolymer, a dimethylaminoethyl methacrylate/vinyl pyrrolidone/hexadecyldimethylammoniumethyl methacrylate bromide terpolymer and an acrylamide/2-acrylamido-2-methyl propane sulfonic acid/2-ethylhexyl methacrylate terpolymer.

16. The method of claim 14, wherein the composition comprises 28 wt. % base treatment acid and the base treatment acid comprises hydrochloric acid.

* * * * *